(12) United States Patent
Wendte et al.

(10) Patent No.: US 9,706,702 B2
(45) Date of Patent: Jul. 18, 2017

(54) PLANTER SEED METER WITH ACCELERATOR WHEEL SYSTEM

(71) Applicant: CNH Industrial America LLC, New Holland, PA (US)

(72) Inventors: Keith W. Wendte, Willowbrook, IL (US); Brian T. Adams, Centralia, MO (US)

(73) Assignee: CNH Industrial America LLC, New Holland, PA (US)

( * ) Notice: Subject to any disclaimer, the term of this patent is extended or adjusted under 35 U.S.C. 154(b) by 161 days.

(21) Appl. No.: 14/619,873

(22) Filed: Feb. 11, 2015

(65) Prior Publication Data

US 2016/0227700 A1 Aug. 11, 2016

(51) Int. Cl.
*A01C 7/04* (2006.01)
*A01C 7/20* (2006.01)

(52) U.S. Cl.
CPC ............... *A01C 7/20* (2013.01); *A01C 7/046* (2013.01)

(58) Field of Classification Search
CPC combination set(s) only.
See application file for complete search history.

(56) References Cited

U.S. PATENT DOCUMENTS

| | | | |
|---|---|---|---|
| 3,434,437 A | 3/1969 | Mark et at. | |
| 4,515,291 A | 5/1985 | Holmes | |
| 4,533,066 A | 8/1985 | Holmes et al. | |
| 6,247,417 B1 | 6/2001 | Heimbuch | |
| 6,481,647 B1 | 11/2002 | Keaton et al. | |
| 6,651,570 B1 | 11/2003 | Thiemke | |
| 6,666,156 B1 | 12/2003 | Mayerle et al. | |
| 7,185,596 B2 | 3/2007 | Thiemke et al. | |
| 7,343,868 B2 | 3/2008 | Stephens et al. | |
| 7,490,565 B2 | 2/2009 | Holly | |
| 7,617,785 B2 | 11/2009 | Wendte | |
| 7,631,606 B2 | 12/2009 | Sauder et al. | |

(Continued)

FOREIGN PATENT DOCUMENTS

| | | |
|---|---|---|
| GB | 1121331 | 7/1968 |
| WO | WO2008136772 | 11/2008 |
| WO | WO2013049198 | 4/2013 |

OTHER PUBLICATIONS

Ebrahim Ahmadi et al.; Development of a Precision Seed Drill for Oilseed Rape; Turkish Jounral of Agriculture ; Jul. 25, 2007, 8 pages.

*Primary Examiner* — Alicia Torres
(74) *Attorney, Agent, or Firm* — Rebecca L. Henkel; Rickard K. DeMille

(57) ABSTRACT

A planter includes seed meters with accelerator wheel systems. Each accelerator wheel system receives singulated seeds from a respective seed meter and spaces the seeds with respect to each other to correct timing and thus spacing anomalies of seeds being released from seed disks of the seed meters at incorrect seed disk release events. Each accelerator wheel system adjusts and to adjust the velocity of the seeds to correspond to planter travel speed for releasing the seeds to drop straight down onto the field, without a horizontal velocity. Seeds are rotationally redirected from a generally downward delivery direction from a seed disk to a generally horizontal delivery direction out of the accelerator wheel system, opposite the tractor and implement travel direction.

11 Claims, 8 Drawing Sheets

(56) References Cited

U.S. PATENT DOCUMENTS

| | | |
|---|---|---|
| 8,276,529 B2 | 10/2012 | Garner et al. |
| 8,468,960 B2 | 6/2013 | Garner et al. |
| 2002/0043200 A1* | 4/2002 | Rosenboom ............ A01C 5/06 111/178 |
| 2004/0134399 A1* | 7/2004 | Stephens ................. A01C 7/20 111/178 |
| 2010/0192819 A1* | 8/2010 | Garner .................... A01C 7/20 111/11 |
| 2012/0240837 A1 | 9/2012 | Garner et al. |
| 2012/0266795 A1* | 10/2012 | Silbernagel ........... A01C 7/046 111/149 |
| 2013/0068144 A1 | 3/2013 | Garner et al. |

* cited by examiner

PLANTER SEED METER WITH ACCELERATOR WHEEL SYSTEM

FIELD OF THE INVENTION

The invention relates generally to row-crop planters and, in particular, to planters with seed meters with accelerator wheel systems.

BACKGROUND OF THE INVENTION

Modern farming practices strive to minimize operating expenses. One way of reducing operating expenses is to operate the farm equipment at relatively faster travel speeds, which reduces the amount of operating time to complete certain tasks. When operating equipment at faster travel speeds, it can be important to maintain the quality of operation that can be achieved while operating at relatively slower operating speeds. This can be especially difficult to accomplish during planting and seeding operations that require precise seed depth placement and spacing accuracy in order to maintain a good seed environment. Delivering singulated seeds at relatively faster equipment speeds can lead to seed tumble in the furrows or otherwise provide inconsistent seed spacing.

SUMMARY OF THE INVENTION

The present invention is directed to a planter with seed meters having accelerator wheel systems that mitigate seed tumble and improve seed spacing at relatively faster planter travel speeds. The accelerator wheel system corrects timing and thus spacing anomalies of seeds being released from seed disks of the seed meters at incorrect seed disk release event. This is done by catching all of the seeds from the seed disks, including any seeds mis-released from the seed disks, and properly spacing the seeds by moving and receiving them into equally spaced pockets of an accelerator wheel. Spacing and timing is also improved by reducing delivery variation typically attributable to bounce down a seed tube by smoothly rotationally redirecting seeds from a generally downward delivery direction from a seed disk to a generally horizontal delivery direction out of the accelerator wheel system, opposite the tractor and implement travel direction. Rotating the accelerator wheel releases the seeds from the accelerator wheel system at consistent release intervals. The accelerator wheel increases the velocity of the seeds to release the seeds from the accelerator wheel system with a horizontal velocity component that is the same as the travel speed of the planter. This provides a relative velocity of the released seeds with respect to the ground or field of approximately zero mph, substantially eliminating seed tumble during planting.

According to another aspect of the invention, the velocity of the seeds in the accelerator wheel system is substantially increased compared to the velocity of the seeds in the seed meter. This may include increasing the velocity of the seeds in the accelerator wheel system by at least about five times, at least about eight times, or at least about ten times greater than that in the seed meter.

According to another aspect of the invention, a planter is provided that includes a chassis towable behind a tractor through an agricultural field for planting seeds onto the field during a planting session. The planter moves through the field in a planter travel direction with a planter velocity ($V_{Planter}$). Multiple row segments are supported by the chassis. Each of the multiple row segments has a seed meter with a seed meter housing and is configured for singulating seeds for individual delivery into the seed trench. The seed meter releases the individual seeds out of a seed meter housing outlet, into an accelerator wheel system. The accelerator wheel system is configured to accelerate the individual seeds in and release the accelerated seeds into the seed trench. The seeds are released from the accelerator wheel system in a seed release direction that is substantially opposite the planter travel direction and with an accelerated seed release velocity ($V_{Accelerated\ Seed\ Release}$) corresponding to a velocity of the seeds released from the accelerator wheel system. The $V_{Accelerated\ Seed\ Release}$ value includes a horizontal velocity component ($V_{Accelerated\ Seed\ Release-Horizontal}$) value corresponding to a horizontal component of the $V_{Accelerated\ Seed\ Release}$ value and wherein the $V_{Accelerated\ Seed\ Release-Horizontal}$ value is substantially equal to the $V_{Planter}$ value. This provides a relative velocity of the released seeds with respect to the ground of approximately zero mph, substantially eliminating seed tumble during planting.

According to another aspect of the invention, the seed meter has a seed disk rotating inside the seed meter housing. The seed disk conveys individual seeds through the seed meter housing for release out of an outlet of the housing and into the accelerator wheel system at a seed meter release velocity ($V_{Seed\ Meter\ Release}$). The accelerator wheel system further includes an accelerator wheel housing with an inlet aligned with or defined by a common passage of the seed meter housing outlet to receive the individual seeds from the seed meter. An accelerator wheel is arranged for rotation inside the accelerator wheel housing. The accelerator wheel receives the seeds from the accelerator wheel housing and accelerates the seeds from the $V_{Seed\ Meter\ Release}$ to the $V_{Accelerated\ Seed\ Release}$ value and releases the seeds from the accelerator wheel housing with the $V_{Accelerated\ Seed\ Release-Horizontal}$ value substantially equal to the $V_{Planter}$ value.

According to another aspect of the invention, the seed disk of the seed meter has seed disk pockets holding the individual seeds relative to the seed disk while the seeds are conveyed by the seed disk through the seed meter housing. The accelerator wheel of the accelerator wheel system further includes accelerator wheel pockets holding the individual seeds relative to the accelerator wheel while the seeds are conveyed by the accelerator wheel through the accelerator wheel housing. The accelerator wheel pockets may rotate with a relatively greater angular velocity in the accelerator wheel housing than the seed disk pockets in the seed meter housing and the accelerator wheel may have a relatively larger diameter than the seed disk. The accelerator wheel and the seed disk may be rotated by a common drive system. The drive system may drive one of the accelerator wheel and the seed disk, and accelerator wheel and seed disk may be in driving and driven connection with each other, for example, by way of an intermediate gear.

According to another aspect of the invention, the accelerator wheel pockets extend into an outer circumferential surface of the accelerator wheel. The outer circumferential surface of the accelerator wheel may include ramped segments extending between the accelerator wheel pockets. Each ramped segment extends between a pair of accelerator wheel pockets with the respective pair of accelerator wheel pockets. The pair of accelerator wheel pockets includes a leading accelerator wheel pocket and a trailing accelerator wheel pocket, with the leading accelerator wheel pocket arranged relatively ahead of the trailing accelerator wheel pocket with respect to a direction of rotation of the accelerator wheel.

According to another aspect of the invention, each ramped segment between the pockets of the accelerator wheel may include a leading end proximate the respective leading accelerator wheel pocket and a trailing end proximate the respective trailing accelerator wheel pocket. The leading end of the ramped segment is spaced relatively farther from an axis of rotation of the accelerator wheel than the trailing end of the ramped segment. Each ramped segment may extend at least partially angularly from the leading end to the trailing end, along a tightening radius relative to the axis of rotation of the accelerator wheel. This provides a generally saw-tooth-type perimeter shape to the accelerator wheel. At each pair of adjacent ramped segments, a transition is defined between a first ramped segment and a second ramped segment. A first radius is defined between the trailing end of the first ramped segment and the axis of rotation of the accelerator wheel. A second radius is defined between the leading end of the second ramped segment and the axis of rotation of the accelerator wheel. A step change in radius value may be defined between the first radius of the trailing end of the first ramped segment and the second radius of the leading end of the second ramped segment. Each accelerator wheel pocket may at least partially define the transition between the respective first and second ramped segments arranged opposite the respective accelerator wheel pocket(s). In this way, each accelerator wheel pocket may define the trailing accelerator wheel pocket relative to the first ramped segment and the leading accelerator wheel pocket relative to the second ramped segment.

According to another aspect of the invention, the accelerator wheel housing includes an accelerator wheel housing outlet and a seed tube that extends away from the accelerator wheel housing outlet. The seed tube directing the seeds released from the accelerator wheel housing to the field. This provides the accelerator wheel system between the seed tube and the seed meter, allowing accelerator wheel system to provide correction anomalous seed spacing and timing characteristics and to increase the seed velocity so that the seeds leave the seed tube at a velocity of approximately zero mph relative to the field.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
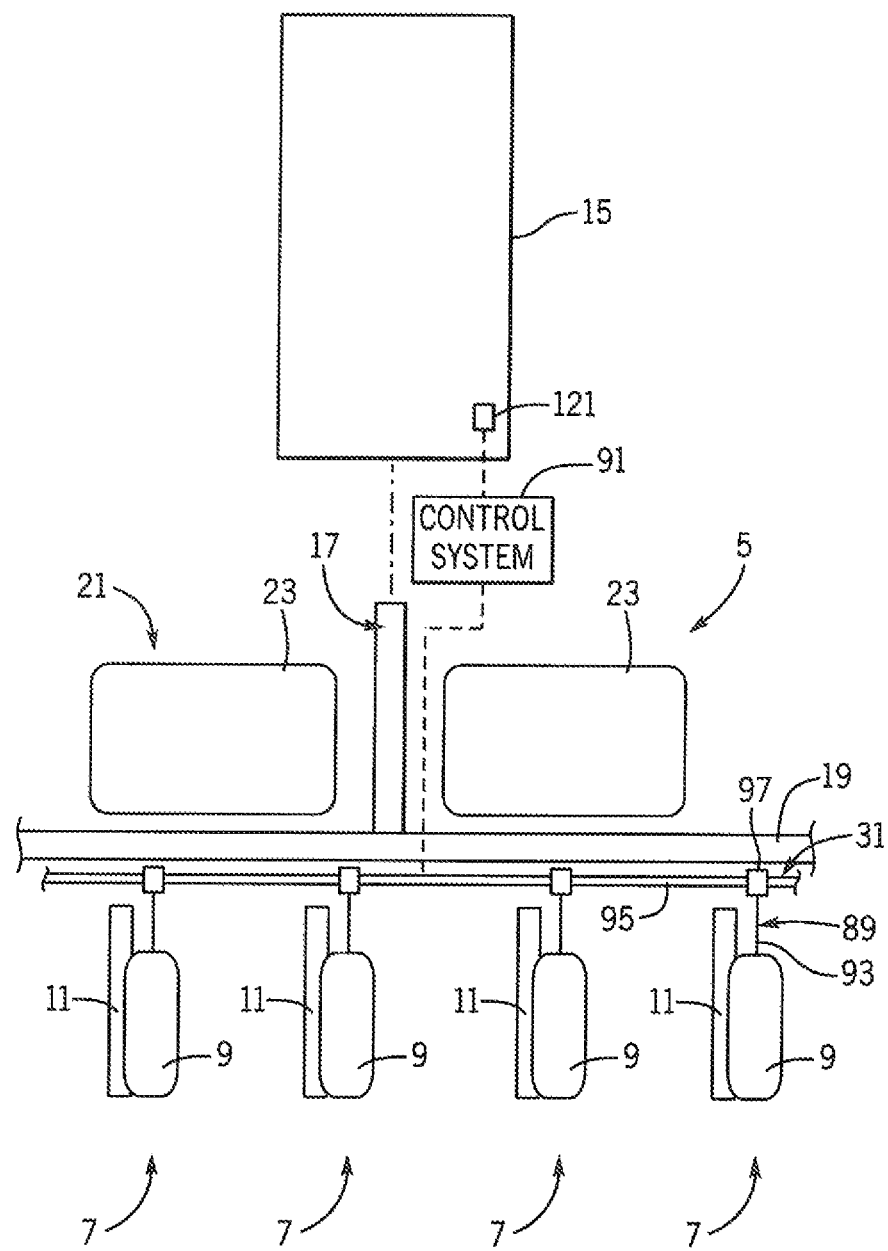
FIG. 1 illustrates a simplified schematic view of a planter with seed meters with accelerator wheel systems in accordance with the present invention.
Figure 2:
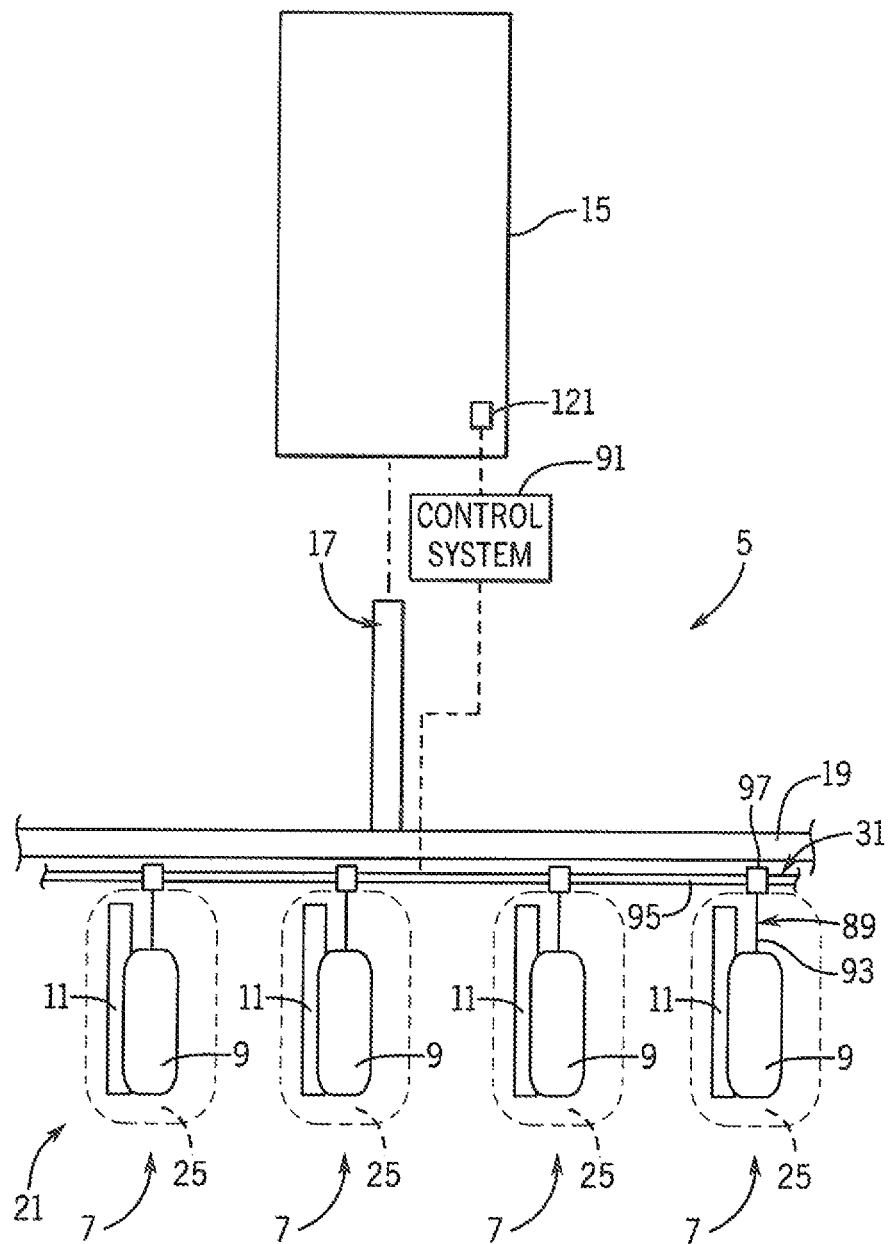
FIG. 2 illustrates a variant of the planter of FIG. 1.

Referring now to the drawings and specifically to the simplified schematic representations of FIGS. 1 and 2, planter 5 is shown with row units 7, each having a seed meter 9 and an accelerator wheel system 11 that minimizes seed tumble of the seeds being planted by delivering the seeds to an agricultural field at a rearward velocity that matches a forward velocity of the planter 5, as explained in greater detail elsewhere herein. Planter 5 may be or may include components of planters available from Case III, such as the EARLY RISER® series planters. The planter 5 is towed behind a tractor 15 to move through the field in a planter travel direction with a planter velocity ($V_{Planter}$) and has a chassis 17 with a frame including a toolbar 19 that supports the multiple row units 7, which are substantially identical. Each row unit 7 has ground-engaging tools (not shown) that may include opening and closing mechanisms such as opener disks and closing disks, respectively, or other ground-engaging tools for opening and closing a furrow. The ground-engaging tools may also include a gauge wheel configured for adjusting furrow depth by limiting soil penetration of the furrow-opening mechanism of the ground-engaging tools while creating a furrow and a press wheel to roll over the closed furrow to firm the soil over the seed to further close the furrow and promote favorable seed-to-soil contact. Seeds are stored in bulk on the planter 5 in a bulk seed storage system 21 that delivers the storage seed to the row units 7. Referring now to FIG. 1, the seed storage system 21 is shown as a central bulk storage system with bulk fill tanks 23 that hold the seeds in bulk that will be pneumatically delivered from the bulk fill tanks 23 to the seed meters 9 at the row units 7. Referring now to FIG. 2, the seed storage system 21 is shown as an on-row bulk storage system, with on-row bulk fill hoppers 25 that hold the seeds in bulk that will be gravity fed to the seed meters 9 at the row units 7.

Figure 3:
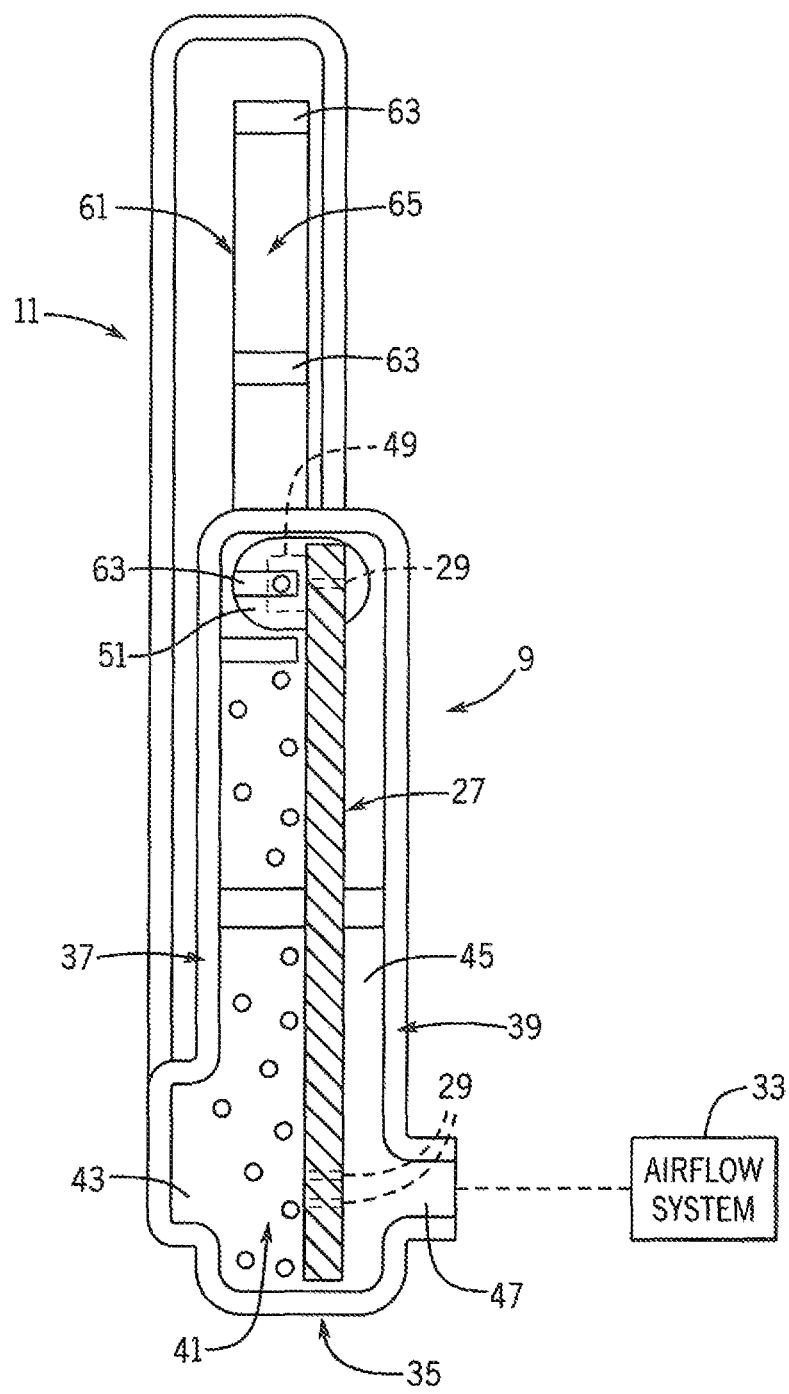
FIG. 3 illustrates a cross-sectional top plan view of a seed meter and accelerator wheel system of the planter of FIG. 1.
Figure 4A:
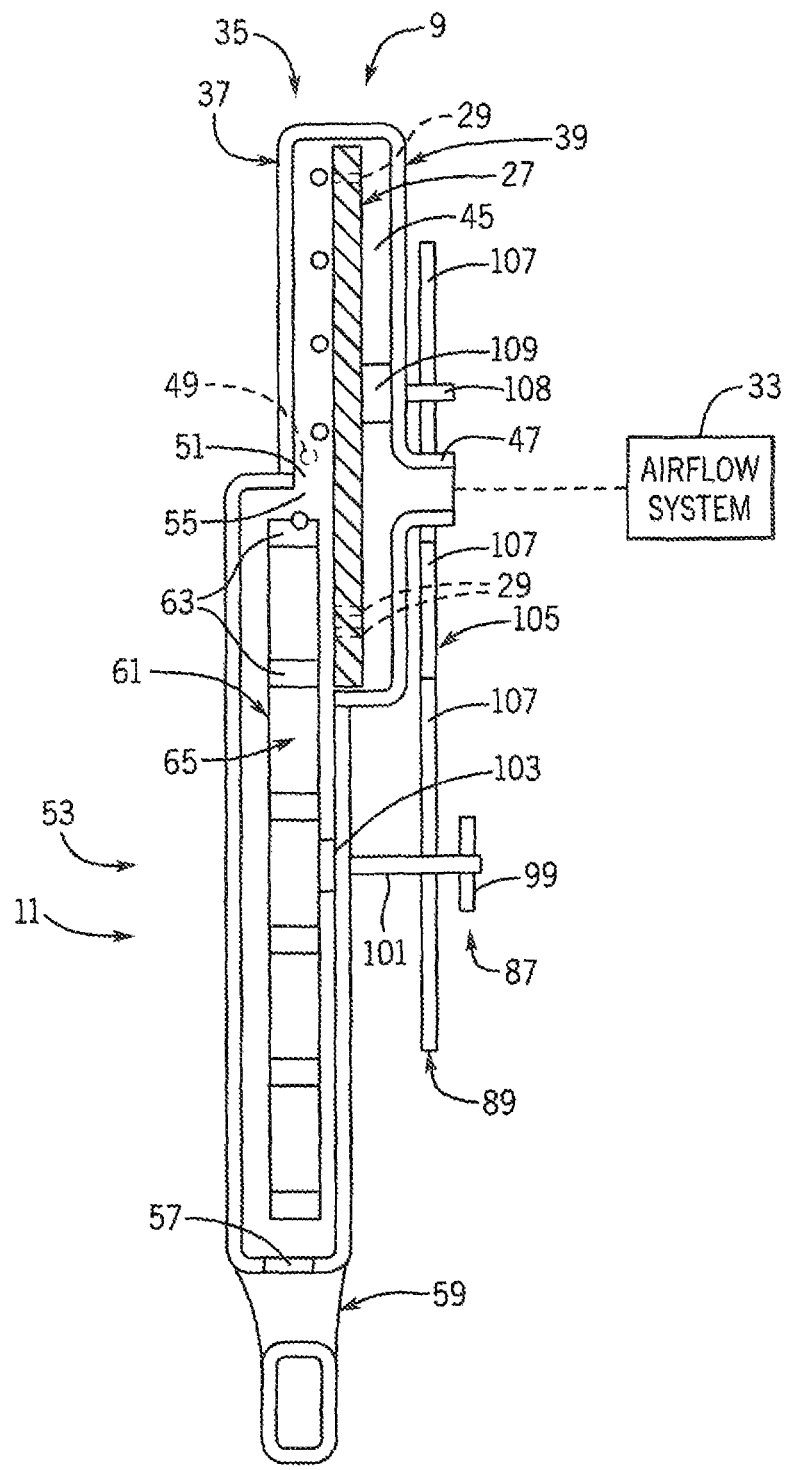
FIG. 4A illustrates a cross-sectional rear elevation view of a seed meter and accelerator wheel system of the planter of FIG. 1.
Figure 4B:
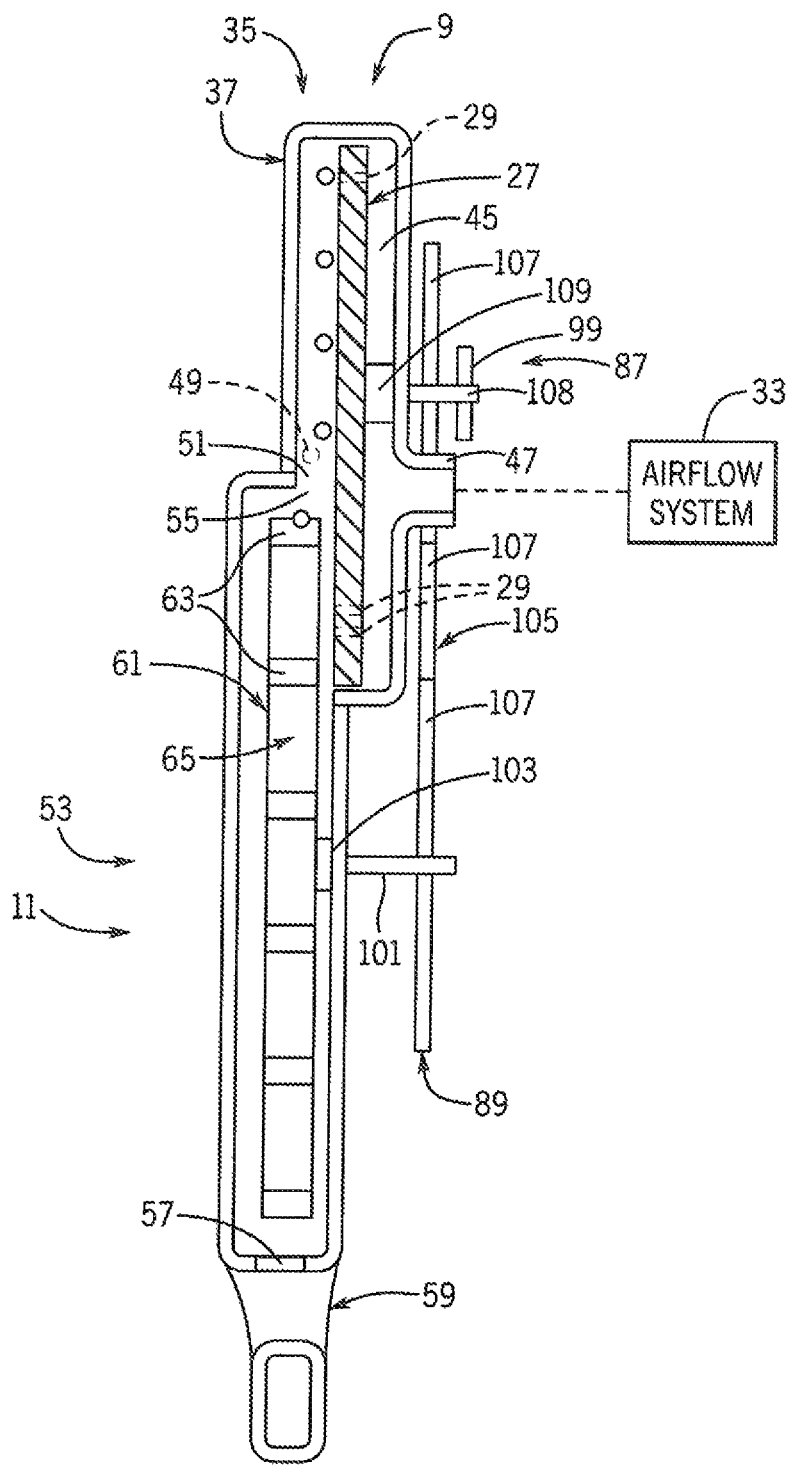
FIG. 4B illustrates a cross-sectional rear elevation view of a variant of the seed meter and accelerator wheel system FIG. 4A.
Figure 4C:
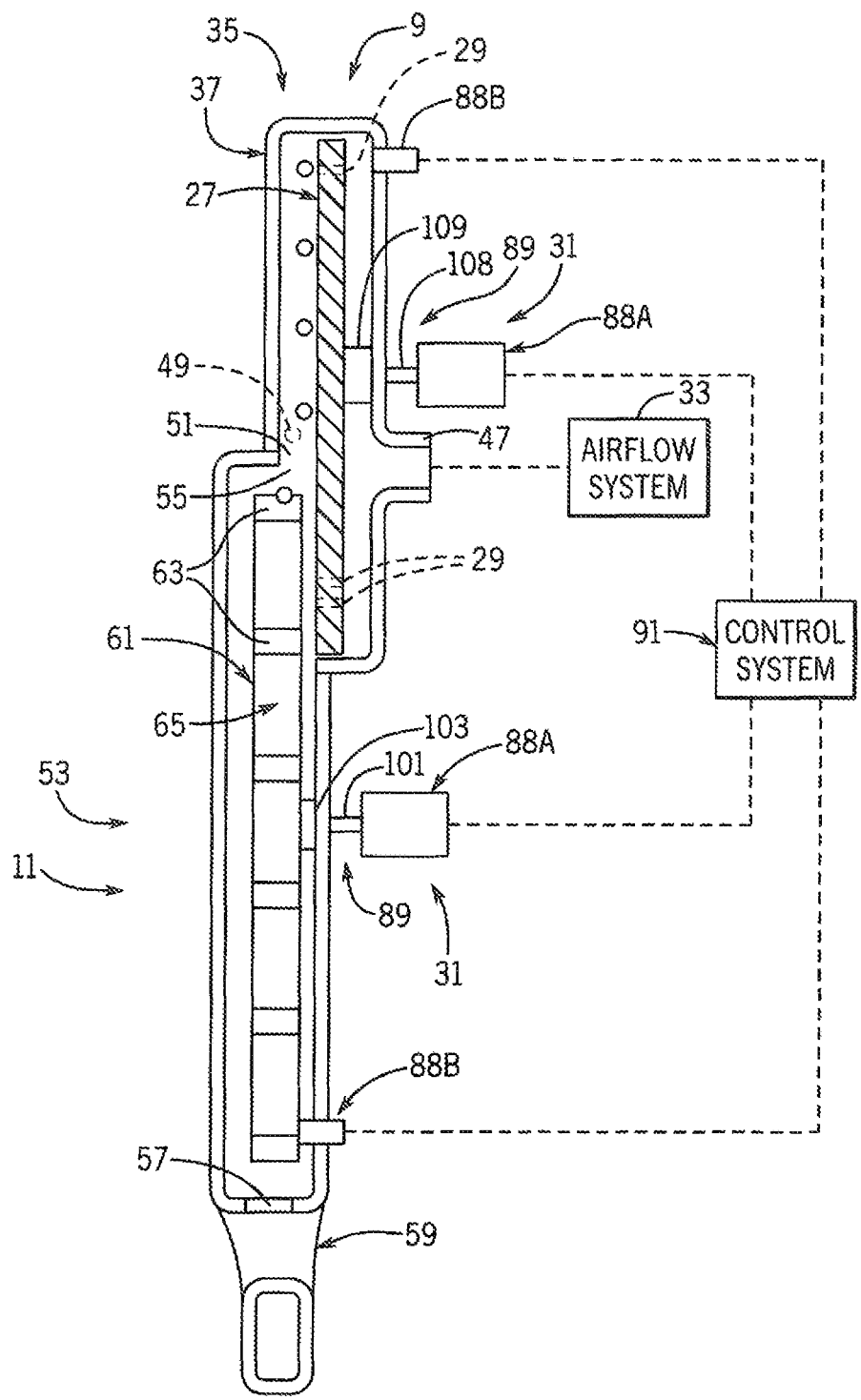
FIG. 4C illustrates a cross-sectional rear elevation view of another variant of the seed meter and accelerator wheel system FIG. 4A.

Referring now to FIGS. 3-4C, regardless of where the seeds are stored on the planter 5 and how the seeds are delivered to the seed meters 9 at the row units 7 (FIGS. 1 and 2), each seed meter 9 includes an internal seed disk 27 with seed disk pockets 29 for picking up and carrying the individual seeds through the seed meter 9. At each row unit 7 (FIGS. 1 and 2), seed disk drive system 31 rotates the seed disk 27 of the seed meter 9 through a seed pool inside of the seed meter 9 to expose the seed disk pockets 29 to the seeds in the seed pool to pick up the seeds in the seed disk pockets 29. Although shown as extending axially through or between opposing surfaces of the seed disk 27, the seed disk pockets 29 may extend at least partially into an outer circumferential surface of the seed disk 27. The seed meters 9 can be purely mechanical-type seed meters 9 or can be pneumatic seed meters 9, as shown. Pneumatic seed meters 9 are operatively connected to an airflow system 33 (FIGS. 3-4C). The airflow system 33 may include a positive air pressure source and/or a vacuum source for establishing positive and/or vacuum pressures and corresponding air flows for operation of seed meters 9 at the row units 7, such as within air pressure chambers of the seed meters 9. The positive air pressure source and vacuum sources can be known pumps, fans, blowers, and/or other known airflow system components. When the seed storage system 21 is configured with a central bulk storage system (FIG. 1), the airflow system 33 includes a seed conveyance airflow system providing an airflow that entrains the seeds to move the seeds from bulk storage in the bulk fill tanks 23 through seed conduits to the row units 7, such as to mini-hoppers (not shown) that feed the seed meters 9. When the seed meters 9 are positive pressure pneumatic seed meters 9, the airflow system 33 is configured to provide a positive airflow and a corresponding positive pressure within the seed meters 9 to push seeds into and hold the seeds in the seed disk pockets 29 of the seed disks 27 by positive pressure through introducing pressurized air into the seed meters 9. When the seed meters 9 are vacuum pressure pneumatic seed meters 9, the airflow system 33 is configured to provide a vacuum airflow and a corresponding negative pressure within the seed meters 9 to pull and hold the seeds in the seed disk pockets 29 of the seed disks 27 by vacuum pressure introduced into the seed meters 9 by evacuating air out of the seed meters.

Still referring now to FIGS. 3-4C, each seed meter 9 has a seed meter housing 35 that includes interconnected covers, shown as a seed-side cover 37 and a vacuum-side cover 39 that collectively enclose the interior of the seed meter 9 and cover the seed disk 27. The seed-side cover 37 is arranged parallel, to and spaced from the seed disk 27. Referring now to FIG. 3, a seed reservoir 41 in which the seed pool collects is defined in the space between the seed-side cover 37 and the seed disk 27. A seed inlet 43 extends through the seed-side cover 37 to define a passageway as an entry point allowing seeds to enter the seed reservoir 41 from the bulk seed storage system 21 or the on-row bulk storage system, with on-row bulk fill hoppers 25 (FIGS. 1 and 2). Referring again to FIGS. 3-4C, the vacuum-side cover 39 is arranged parallel to and spaced from the seed disk 27, on the other side of the seed disk 27 than the seed-side cover 37. An air pressure chamber shown as vacuum chamber 45, in which the vacuum pressure is created in the seed meter housing 35, is defined in the space between the vacuum-side cover 39 and the seed disk 27. Vacuum inlet 47 extends through the vacuum-side cover 39 to define a passageway through which air can flow out of the seed meter housing 35 to establish vacuum pressure inside the seed meter 9. Release location 49 is defined inside of seed meter housing 35 where the seeds are released from the seed disk pockets 29, which may correspond to a position of vacuum cutoff in the seed meter housing 35. Seed meter housing 35 includes seed meter housing outlet 51 that is configured to direct the seeds out of the seed meter housing 35 during seed meter exiting events at seed meter release velocity ($V_{Seed\ Meter\ Release}$), into the accelerator wheel system 11.

Still referring to FIGS. 3-4C, the accelerator wheel system 11 mitigates seed tumble and improves seed spacing at relatively faster planter travel speeds. The accelerator wheel system 11 corrects timing and thus spacing anomalies of seeds being released from seed disk 27 of the seed meter 9 if there are incorrect seed disk release events and increases the velocity of the seeds to release the seeds from the accelerator wheel system 11 to approximate the planter travel speed $V_{Planter}$ to provide a relative velocity of the released seeds with respect to the ground or field of approximately zero mph, substantially eliminating seed tumble during planting. The accelerator wheel system 11 includes accelerator wheel housing 53 with inlet 55 receiving the individual seeds released out of the seed meter housing outlet 51 and an accelerator housing outlet 57 that delivers the seeds into seed tube 59 for directing the seeds from the accelerator wheel system 11 and thus the row unit 7 (FIGS. 1 and 2) to the seed trench. Accelerator wheel 61 is arranged for rotation inside the accelerator wheel housing 53. An upper portion of the accelerator wheel 61 is transversely stacked with respect to or overlaps a lower portion of the seed disk 27 (FIGS. 4A-4C and 5). The accelerator wheel 61 has accelerator wheel pockets 63 holding the individual seeds while moving the seeds through the accelerator wheel housing 53, from inlet 55 to outlet 57 for release through an exit of the seed tube 59. Accelerator wheel pockets 63 extend into an outer circumferential surface 65 that defines an outer periphery of the accelerator wheel 61.

Figure 5:
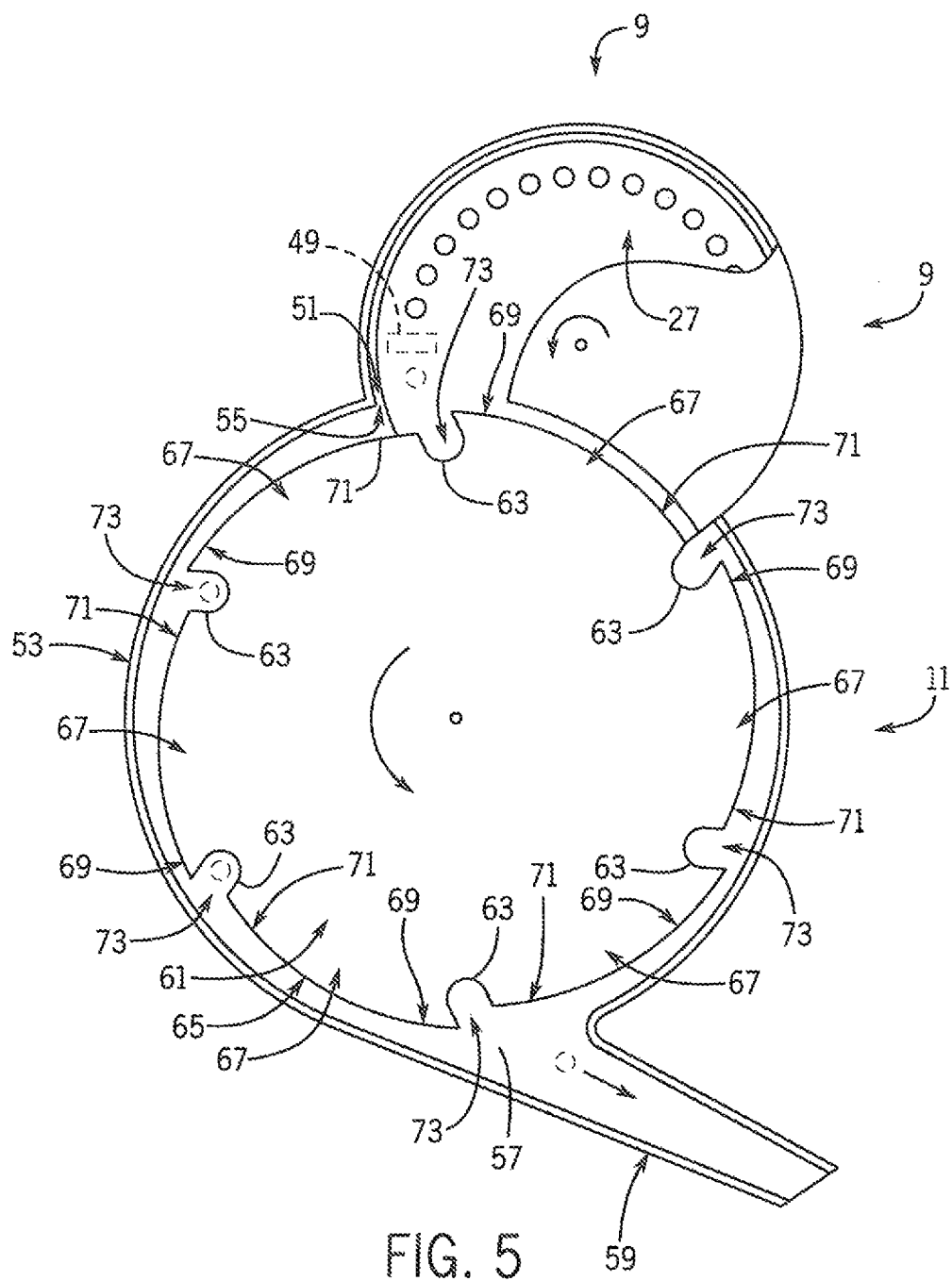
FIG. 5 illustrates a cross-sectional side elevation view of a seed meter and accelerator wheel system of the planter of FIG. 1.
Figure 6:
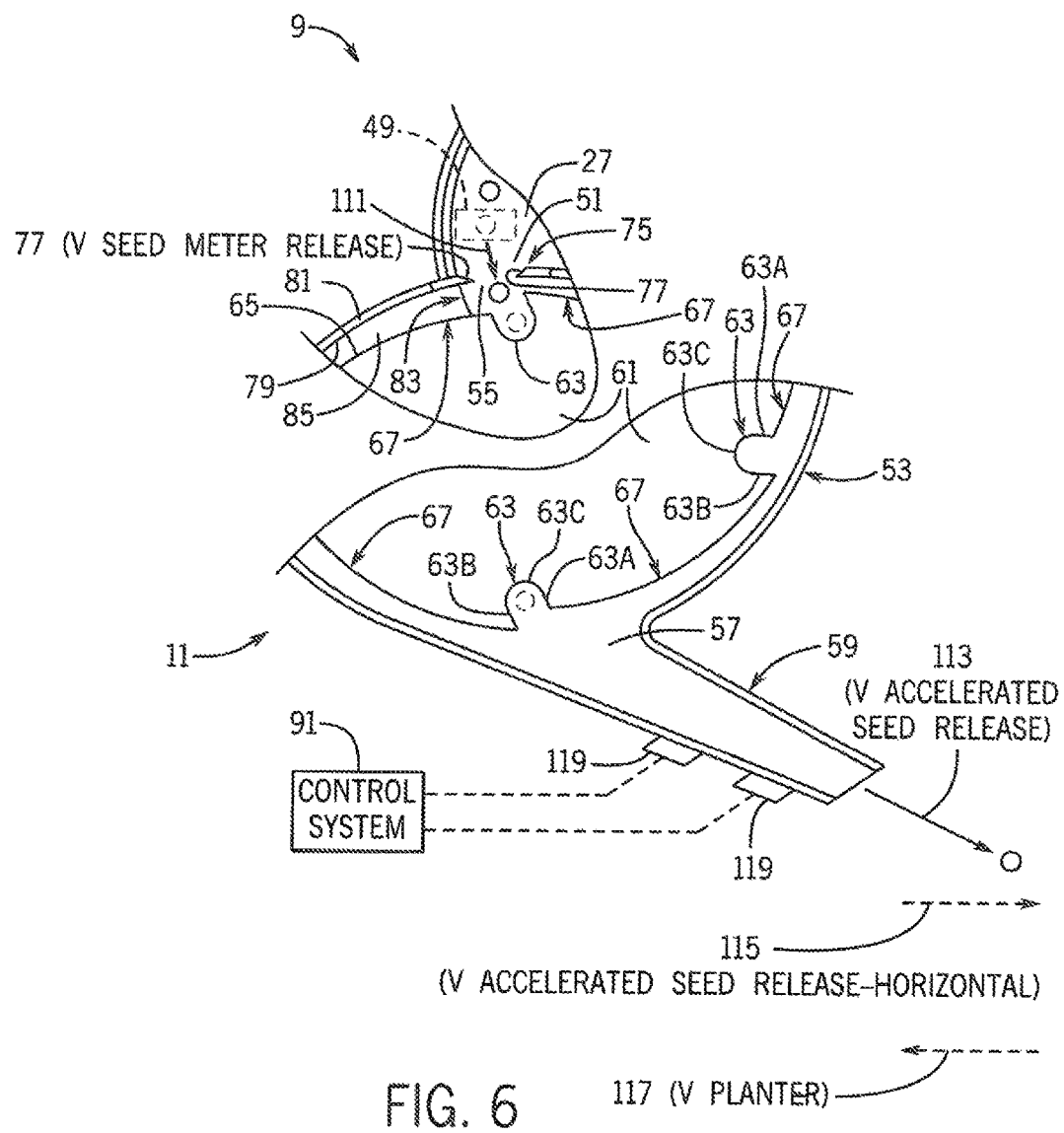
FIG. 6 illustrates a close-up cross-sectional side elevation view of a portion of a seed meter and accelerator wheel system of the planter of FIG. 1.

Referring now to FIGS. 5 and 6, the outer circumferential surface 65 of accelerator wheel 61 has ramped segments 67 extending between respective pairs of accelerator wheel pockets 63. Referring now to FIG. 6 and shown at the lower portion of the accelerator wheel 61, each accelerator wheel pocket 63 has a front pocket wall 63A, a back pocket wall 63B, and a lower pocket wall 63C interconnecting the front and back pocket walls 63A, 63B. The front and back pocket walls 63A, 63B extend at non-perpendicular angles with respect to the outer circumferential surface 65, extending angularly away from the direction of rotation of the accelerator wheel 61. The lower pocket wall 63C extends along an arc to connect respective ends of the front and back pocket walls 63A, 63B. Referring again to FIG. 5, each accelerator wheel pocket 63 defines a leading accelerator wheel pocket with respect to the adjacent accelerator wheel pocket 63 behind it and also defines a trailing accelerator wheel pocket 63 with respect to the accelerator wheel pocket 63 in front of it, relative to the direction of rotation of the accelerator wheel 61. Between each adjacent pair of seed pockets 63, each ramped segment 67 of the accelerator wheel 61 has a leading end 69 near the corresponding first or leading seed pocket 63 and a trailing end 71 near the corresponding second or trailing seed pocket 63. As shown in FIGS. 5 and 6, each ramped segment 67 has its leading end 69 (FIG. 5) connected to the outer end of the back pocket wall 63B (FIG. 6) of the respective leading seed pocket 63 and extends in a direction away from the direction of rotation of the accelerator wheel 61 to its trailing end 71 (FIG. 5) connected to the outer end of the front pocket wall 63A (FIG. 6) of the respective trailing seed pocket 63 of the pair of seed pockets 63 at the opposite ends of the ramped segment 67. The accelerator wheel 61 is shown with a generally saw-tooth-type perimeter shape, although it is understood that the accelerator wheel 61 may have other perimeter shapes. The saw-tooth-type perimeter shape is provided by a configuration of the accelerator wheel 61 with the ramped segment leading end 69 spaced relatively farther from an axis of rotation of the accelerator wheel 61 than the ramped segment trailing end 71. Each ramped segment 67 extends at least partially angularly, which may also curve, from the leading end 69 to the trailing end 71, along a tightening radius relative to the axis of rotation of the accelerator wheel 61. Between a pair of adjacent ramped segments 67, a transition 73 providing a step change in radius value of the accelerator wheel 61 is defined between the first radius of the ramped segment trailing end 71 of a first ramped segment 67 of the pair and the second radius of the ramped segment leading end 69 of the second ramped segment of the pair. The transition 73 can be defined at least partially by the accelerator wheel pocket 63 between each pair of ramped segments 67.

Referring again to FIG. 6, the ramped segments 67 cooperate with a guide 75 extending between the seed meter housing outlet 51 and the accelerator housing inlet 55. The guide 75 has a pair of guide surfaces 77 that are inclined with respect to each other, tapering downwardly from the seed meter 9 to the accelerator wheel system 11 to facilitate funneling of the seeds falling from the release location 49 into the accelerator wheel system 11. A space between upper ends of the guide surfaces 77 defines the seed meter housing outlet 51. A space between lower ends of the guide surfaces 77 defined the accelerator housing inlet 55. A spacing correction arrangement 83 is defined by guide 75, accelerator wheel ramped segments 67, accelerator wheel pocket 63, and an inner surface 79 of a circumferential side wall 81 accelerator wheel housing 5, that cooperate with each other to provide spacing correction of mis-released seeds from the seed meter 9 by facilitating receipt of the seeds in the pocket 63 as a re-spacing event(s) before planting. When seeds fall from the release location 49 with a seed meter 9 through the guide 75, if a seed is not immediately received in the accelerator wheel pocket 63, then the seed will momentarily be held within the spacing correction arrangement 83 until it is received in an advancing accelerator wheel pocket 63. This is because the seed is temporarily impinged in a space 85 between the accelerator wheel outer circumferential surface 65 in the circumferential side wall inner surface 79 of the accelerator wheel housing 53 while the ramped segment 67 slides underneath the seed, gradually increasing the height dimension of the space 85 until an advancing accelerator wheel pocket 63 passes underneath and receives the seed to carry the seed through the rest of the accelerator wheel housing 53 until the seed reaches and passes through the outlet 57. For relatively larger seeds that do not fit in the space 85, if the seed is not immediately received in an accelerator wheel pocket 63, the seed is held in the guide 75 while the ramped segment 67 slides underneath the seed, until an advancing accelerator wheel pocket 63 passes underneath and receives the seed to carry the seed through the rest of the accelerator wheel housing 53 until the seed reaches and passes through the outlet 57.

Referring now to FIGS. 1, 2, and 4A-4C, during use, drive system 31 rotates the seed disk 27 (FIGS. 4A-4C) and accelerator wheel 61. Drive system 31 includes a transmission assembly 89 selectively delivering power to the seed meters 9 and accelerator wheel system 11 for rotating the seed disk 27 (FIGS. 4A-4C), and accelerator wheel 61 is controlled by control system 91. Control system 91 includes a tractor control system and/or planter control system, which can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the seed meters 9, accelerator wheel system 11, other components of the planter 5 and/or tractor 15. Control system 91 monitors the travel speed of the tractor 15 and thus planter velocity $V_{Planter}$ and controls rotational speed of the accelerator wheel system 11 to provide a desired seed delivery velocity from the accelerator wheel system 11 to match planter velocity $V_{Planter}$ so that a relative velocity of the released seeds with respect to the ground or field is approximately zero mph, such as less than about 1 mph or 0.5 mph, or sufficiently slow to prevent seed tumble that would move the seed more than about 2 inches or more than about 1 inch within the furrow, as explained in greater detail elsewhere herein.

Referring to FIGS. 1 and 2, the transmission assembly 89 is shown with mechanical chain drives 93 that deliver rotating driving power from a rotating shaft 95. Shaft 95 is driven to rotate from the ground through movement of the planter 5, such as by a traction-drive-type drive wheel, ground-engaging drive sprocket, or may be rotated by a motor such as an electric motor, pneumatic motor, or hydraulic motor. Clutches 97 are controlled by the control system 91 to engage and disengage for selectively transmitting rotation of the shaft 95 into movement of chains of the chain drives 93. It is understood that instead of chains and sprockets, chain drives 93 may incorporate other power transmission components such as belts and pulleys. Referring now to FIG. 4A, chain drive 93 (FIGS. 1 and 2) rotates a sprocket 99 attached to a rotating accelerator wheel shaft 101 connected to hub 103 that supports and rotates the accelerator wheel 61. Gear train 105 includes gears 107 that drivingly connect the accelerator wheel 61 to the seed disk 27. The gears 107 transmit rotation of the accelerator wheel shaft 101 to a shaft 108 connected to hub 109 that supports and rotates seed disk 27. Referring now to FIG. 4B, unlike the accelerator wheel system 11 of FIG. 4A that initially drives the accelerator wheel 61, the accelerator wheel system 11 is shown configured to initially drive the seed disk 27. Chain drive 93 (FIGS. 1 and 2) rotates sprocket 99 attached to seed disk shaft 108 that rotate the hub 109 rotates seed disk 27. Gear train 105 transmits power from seed disk shaft 108 to accelerator wheel shaft 101 to rotate hub 103 and accelerator wheel 61. It is understood that the chain drive(s) 93 may instead drive an intermediate or jack shaft (not shown) that delivers power for rotating both the seed disk 27 and the accelerator wheel 61 through separate chains receiving power from the jack shaft. Referring now to FIG. 4C, it is understood that the transmission assembly 89 can be configured to separately drive rotation of seed disk 27 and accelerator wheel 61, as controlled by control system 91. FIG. 4C shows the drive system 31 having a motor 88A such as an electric motor, pneumatic motor, or hydraulic motor, separately controlled by control system 91, and separately driving each of, the seed disk 27 and accelerator wheel 61. Motors 88A are shown with output shafts coaxially connected to and directly driving the shafts 101, 108 and thus also driving hubs 103, 109 and accelerator wheel 61 and seed disk 27, respectively. It is understood that motors 88A may instead drive the hubs 103, 109 themselves or the accelerator wheel 61 and seed disk 27, themselves, such as through cooperating toothed surfaces of sprockets or gear-type interfaces at outer circumferential surfaces, flanges, or other interfaces. Regardless of how motors 88A drive rotation of the seed disk 27 and accelerator wheel 61, sensors 88B are arranged with respect to the seed meter and accelerator wheel housings 35, 53 to detect rotational speed(s) of seed disk 27 and accelerator wheel 61. Control system 91 receives signals from the sensors 88B corresponding to the respective rotational speed(s) of seed disk 27 and accelerator wheel 61 and controls to the motors 88A to synch or keep timed the rotations to achieve desired delivery rate and velocity according to programming of the control system 91.

Referring again to FIGS. 4A-4C, during use, drive system 31 rotates the seed disk 27 and the accelerator wheel 61 so that the accelerator wheel pocket 63 has a greater angular velocity than the seed disk pockets 29. This can be done by arranging the accelerator wheel pocket 63 radially farther from an axis of rotation of the accelerator wheel 61 than a radial distance from the seed disk pockets 29 from the axis of rotation of the seed disk 27 and also rotating the accelerator wheel 61 at faster rotational speed and the seed disk 27. In this way, seeds leave the accelerator wheel system 11 at a greater velocity than that at which the seeds left the seed meter 9. The accelerator wheel system 11 can accelerate the seeds to a relatively greater velocity in the accelerator wheel system 11, which can be at least about five times, at least about eight times, or at least about ten times greater than the velocity of the seeds in the seed meter 9. The rotational speed differential between the rotational speeds of the seed disk 27 and accelerator wheel 61 can be provided by the gear train 105 by separately driving the seed disk 27 and accelerator wheel 61 at different rotational speeds (FIGS. 4A and 4B) or by directly separately driving seed disk 27 and accelerator wheel 61 at different speeds by way of motors 88A (FIG. 4C).

Referring again to FIG. 6, regardless of how the rotational speed differential between the rotational speeds of the seed disk 27 and accelerator wheel is established, seeds are accelerated in the accelerator wheel system 11 compared to seed velocity in the seed meter 9. As represented by the vertical solid line arrow pointing down and labeled 111, each seed is released from the seed disk 27 through the seed meter housing outlet 51 at a seed meter release velocity ($V_{Seed\ Meter\ Release}$) the value that relates to the angular velocity of the seed disk pockets 29 (FIG. 4) and acceleration due to gravity. The seed is directed through the guide 75 into accelerator wheel system 11. Accelerator wheel system 11 accelerates seed to a relatively greater velocity and releases the seed out of the accelerator wheel housing outlet 57 and the seed tube 59, traveling at an accelerated seed release velocity ($V_{Accelerated\ Seed\ Release}$) toward the seed trench. The $V_{Accelerated\ Seed\ Release}$ value is represented by the angled solid line arrow pointing away from the seed tube 59 and labeled 113. The $V_{Accelerated\ Seed\ Release}$ value 113 has a vertically oriented velocity component and a horizontally oriented velocity component. The horizontally oriented velocity component of the $V_{Accelerated\ Seed\ Release}$ value 113 is shown as horizontal velocity component ($V_{Accelerated\ Seed\ Release-Horizontal}$) value as represented by the dashed line arrow pointing to the right and labeled 115. The $V_{Accelerated\ Seed\ Release-Horizontal}$ value 115 is in the opposite direction and substantially equal to the $V_{Planter}$ value of the planter velocity as represented by the dashed line arrow pointing to the left and labeled 117. This provides a relative velocity of the released seeds with respect to the ground of approximately zero mph, substantially eliminating seed tumble during planting.

Still referring to FIG. 6, to maintain a relative velocity of the released seeds with respect to the ground of approximately zero mph, the control system 91 evaluates data corresponding to signals from a pair of seed sensors 119 that are spaced from each other and arranged upon the seed tube 59 and configured to detect seed traveling past each sensor 119. Control system 91 calculates the $V_{Accelerated\ Seed\ Release}$ value 113 and/or the $V_{Accelerated\ Seed\ Release-Horizontal}$ value 115 by dividing the fixed distance between the seed sensors 119 by the time that it takes the seed to travel from the first upstream sensor 119 to the second downstream sensor 119. Control system 91 evaluates the $V_{Accelerated\ Seed\ Release-Horizontal}$ value 115 to the $V_{Planter}$ value 117 and can be determined by the control system 91 based on a signal from speed sensor 121 arranged at the tractor 15 (FIGS. 1 and 2). If control system 91 identifies a discrepancy between the $V_{Accelerated\ Seed\ Release-Horizontal}$ value 115 and the $V_{Planter}$ value 117, the control system 91 commands the drive system 31 to rotate the accelerator wheel 61 at a faster or slower rotational speed to attenuate the discrepancy between the $V_{Accelerated\ Seed\ Release-Horizontal}$ value 115 and the $V_{Planter}$ value 117.

Many changes and modifications could be made to the invention without departing from the spirit thereof. The scope of these changes will become apparent from the appended claims.

We claim:

1. A planter, comprising:
a chassis towable behind a tractor through an agricultural field for planting seeds onto the field during a planting session, wherein the planter moves through the field in a planter travel direction with a planter velocity ($V_{Planter}$);
multiple row segments supported by the chassis, each of the multiple row segments including,
a seed meter with a seed meter housing having a seed meter housing outlet and supported at the row segment for singulating seeds for individual delivery into a seed trench of the field, wherein the seed meter releases the individual seeds out of the seed meter housing outlet, wherein the seed meter further comprises a seed disk rotating inside the seed meter housing to convey individual seeds through the seed meter housing for release of individual seeds out of the seed meter housing outlet at a seed meter release velocity ($V_{Seed\ Meter\ Release}$), and wherein the seed disk further comprises seed disk pockets holding the individual seeds relative to the seed disk while the seeds are conveyed by the seed disk through the seed meter housing; and
an accelerator wheel system receiving the individual seeds from the seed meter housing outlet and wherein the accelerator wheel system is configured to accelerate the individual seeds in the accelerator wheel system and release the seeds onto the field in a seed release direction that is substantially opposite the planter travel direction and with an accelerated seed release velocity ($V_{Accelerated\ Seed\ Release}$), wherein the $V_{Accelerated\ Seed\ Release}$ value includes a horizontal velocity component ($V_{Accelerated\ Seed\ Release-Horizontal}$) value that is substantially equal to the $V_{Planter}$ value, wherein the accelerator wheel system further comprises
an accelerator wheel housing having an inlet receiving the individual seeds released out of the seed meter housing outlet; and
an accelerator wheel rotating inside the accelerator wheel housing, wherein the accelerator wheel receives the seeds from the accelerator wheel housing, wherein the accelerator wheel of the accelerator wheel system further comprises accelerator wheel pockets holding the individual seeds relative to the accelerator wheel while the seeds are conveyed by the accelerator wheel through the accelerator wheel housing, wherein the accelerator wheel pockets extend into an outer circumferential surface of the accelerator wheel, wherein the outer circumferential surface of the accelerator wheel includes ramped segments extending between the accelerator wheel pockets, and wherein the accelerator wheel accelerates the seeds from the $V_{Seed\ Meter\ Release}$ to the $V_{Accelerated\ Seed\ Release}$ value and releases the seeds from the accelerator wheel housing with the $V_{Accelerated\ Seed\ Release-Horizontal}$ value substantially equal to the $V_{Planter}$ value.

2. The planter of claim 1, wherein the accelerator wheel pockets rotate with a relatively greater angular velocity in the accelerator wheel housing than the seed disk pockets in the seed meter housing.

3. The planter of claim 2, wherein the accelerator wheel has a relatively larger diameter than the seed disk.

4. The planter of claim 3, wherein the accelerator wheel and the seed disk are rotated by a common drive system.

5. The planter of claim 1, wherein each ramped segment extends between a pair of accelerator wheel pockets with the respective pair of accelerator wheel pockets including a leading accelerator wheel pocket and a trailing accelerator wheel pocket with the leading accelerator wheel pocket arranged relatively ahead of the trailing accelerator wheel pocket with respect to a direction of rotation of the accelerator wheel.

6. The planter of claim 5, wherein each ramped segment includes a leading end proximate the respective leading accelerator wheel pocket and a trailing end proximate the respective trailing accelerator wheel pocket, and wherein the leading end of the ramped segment is spaced relatively further from an axis of rotation of the accelerator wheel than the trailing end of the ramped segment.

7. The planter of claim 6, wherein each ramped segment extends at least partially angularly from the leading end to the trailing end in a tightening radius relative to the axis of rotation of the accelerator wheel providing a generally saw-tooth-type perimeter shape to the accelerator wheel.

8. The planter of claim 7, wherein at each pair of adjacent ramped segments, a transition is defined between a first ramped segment and a second ramped segment, wherein a first radius is defined between the trailing end of the first ramped segment and the axis of rotation of the accelerator wheel and a second radius is defined between the leading end of the second ramped segment and the axis of rotation of the accelerator wheel, and wherein a step change in radius value is defined between the first radius of the trailing end of the first ramped segment and the second radius of the leading end of the second ramped segment.

9. The planter of claim 8, wherein each accelerator wheel pocket at least partially defines the transition between the respective first and second ramped segments arranged opposite the accelerator wheel pocket such that the accelerator wheel pocket defines the trailing accelerator wheel pocket relative to the first ramped segment and the leading accelerator wheel pocket relative to the second ramped segment.

10. The planter of claim 1, wherein the accelerator wheel housing includes an accelerator wheel housing outlet and a seed tube extends away from the accelerator wheel housing outlet directing seeds released from the accelerator wheel housing to the seed trench such that the accelerator wheel system is arranged between the seed tube and the seed meter.

11. The planter of claim 1, wherein the seed meter includes a release location at which individual seeds are released from the seed disk pockets of the seed disk and wherein the accelerator wheel housing inlet is arranged adjacent the release location of the seed meter with a portion of the accelerator wheel overlapping a portion of the seed disk such that the seeds released from the seed disk fall toward the outer circumferential surface of the accelerator wheel.

* * * * *